United States Patent [19]

Takashima et al.

[11] Patent Number: 4,771,474
[45] Date of Patent: Sep. 13, 1988

[54] APPARATUS FOR PROCESSING CHARACTER OR PICTORIAL IMAGE DATA

[75] Inventors: Masatake Takashima; Shinichiro Fukuda; Hiroyuki Shibata, all of Toshima, Japan

[73] Assignee: Shaken Co., Ltd., Tokyo, Japan

[21] Appl. No.: 57,390

[22] Filed: Jun. 2, 1987

Related U.S. Application Data

[63] Continuation-in-part of Ser. No. 569,959, Jan. 11, 1984, abandoned.

[30] Foreign Application Priority Data

| Oct. 3, 1983 | [JP] | Japan | 58-183071 |
| Oct. 3, 1983 | [JP] | Japan | 58-183072 |
| Oct. 3, 1983 | [JP] | Japan | 58-183073 |
| Oct. 3, 1983 | [JP] | Japan | 58-183074 |
| Oct. 3, 1983 | [JP] | Japan | 58-183075 |

[51] Int. Cl.⁴ .............................. G06K 9/36
[52] U.S. Cl. ...................... 382/56; 382/22; 382/23; 382/24; 382/25; 358/263
[58] Field of Search .................. 382/21–25, 382/56; 358/260, 262, 263; 340/720, 728, 729, 732, 736, 743; 364/521, 719

[56] References Cited

U.S. PATENT DOCUMENTS

| 3,699,318 | 10/1972 | Underkoffler et al. | 364/719 |
| 4,254,468 | 3/1981 | Craig | 340/750 |
| 4,298,945 | 11/1981 | Kyte et al. | 340/750 |
| 4,338,673 | 7/1982 | Brown | 340/748 |
| 4,513,444 | 4/1985 | Oki et al. | 358/260 |
| 4,524,456 | 6/1985 | Araki et al. | 382/56 |
| 4,542,412 | 9/1985 | Fuse et al. | 382/56 |

Primary Examiner—Leo H. Boudreau
Assistant Examiner—Jose L. Couso
Attorney, Agent, or Firm—Sherman and Shalloway

[57] ABSTRACT

An apparatus for processing character or pictorial image or the like for splitting the outline of a character, which is developed on x- and y-coordinates, into a plurality of blocks $[P_1, P_n]$ (where $P_1$ and $P_n$ are a start point and an end point of an arbitrary block respectively) each defined by a univalent function involving x as a variable, then producing block data to specify the shape of each block, and storing a set of such block data as the compressed data of one character to accomplish compression of the data.

4 Claims, 13 Drawing Sheets

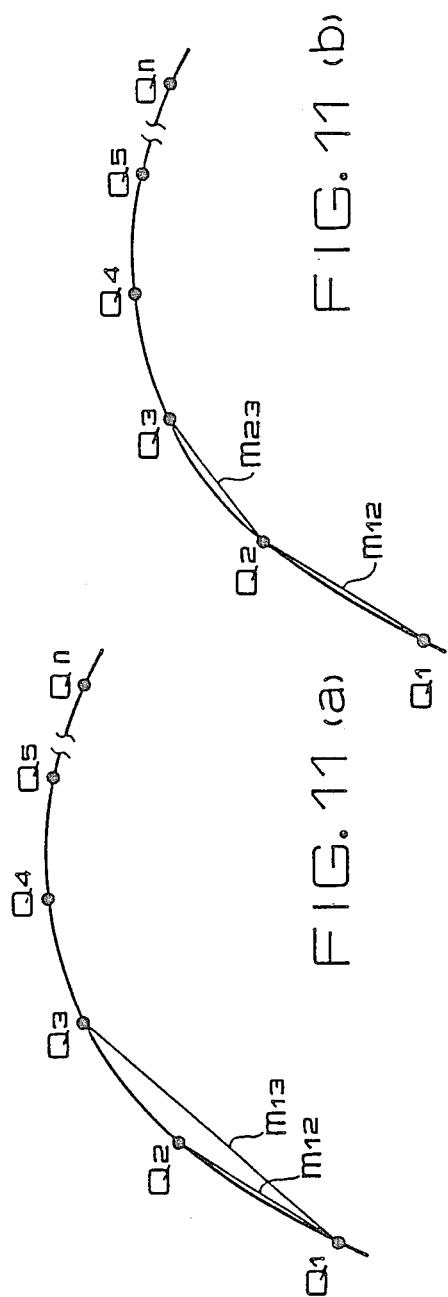
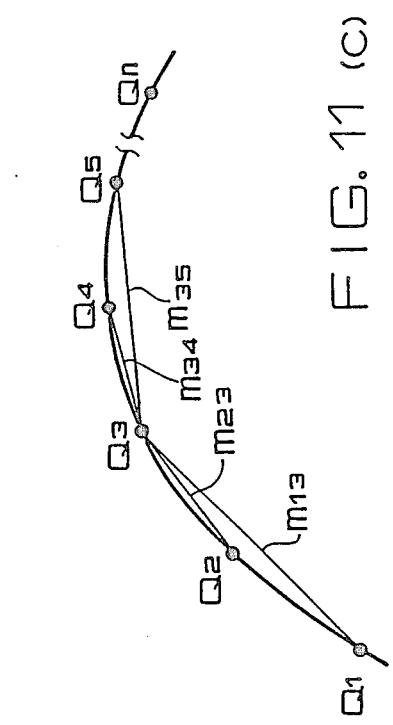
FIG. 11 (a)
FIG. 11 (b)
FIG. 11 (c)

APPARATUS FOR PROCESSING CHARACTER OR PICTORIAL IMAGE DATA

CROSS REFERENCE TO OTHER APPLICATION

This application is a continuation-in-part of application Ser. No. 569,959, filed Jan. 11, 1984, now abandoned.

BACKGROUND OF THE INVENTION

1. Field of the Invention

This invention relates to an apparatus for processing the data of a character, pictorial image or the like (hereinafter called "character"), the apparatus storing the outline shape of the character so as to compress the amount of stored data. In particular, this invention provides an apparatus for classifying the outline of the character into straight lines and curved lines and further shifting a sampling point candidate on the curved portion in trial and error. It is determined based on deviation $\epsilon$ obtained every outline point within a sampling candidate segment, whether the above trial and error is effected and in which direction the sampling point candidate is advanced or retraced. Then the curved portion is split into a plurality of sampling segments with establishing the sampling segments in turn from the start point of the curved portion, and thereby the straight portion and each sampling segment being stored.

2. Description of the Prior Art

It is well known that binary data obtained by resolving a character into dots has an extremely high redundancy. In order to reduce such redundancy, there have been proposed a variety of data compression techniques heretofore.

One of the prior data compression techniques is a so-called outline method which compresses the quantity of data by grasping the shape of a character in accordance with its outline and storing the data that specify the outline.

In the data compression carried out on the basis of such outline method, there are known the procedure of straight line (vector) approximation shown in FIG. 1 and n-degree curve approximation shown in FIG. 2.

The straight line approximation illustrated as an example in FIG. 1 is based on the techniques disclosed in U.S. Pat. No. 4,199,815 (Ser. No. 905,451; Kyte et al.; JP Laid-open No. 149522/1979)

U.S. Pat. No. 4,254,468 (Division of Ser. No. 905,451; Craig)

U.S. Pat. No. 4,298,945 (Division of Ser. No. 905,451; Kyte et al.)

U.S. Pat. No. 4,338,673 (Ser. No. 181,808; Brown; JP Laid-open No. 79154/1980)

Summarizing the above techniques, the data compression is achievable in such a manner that an outline 1 of a character plotted by a dotted line is first approximated with a set of vectors 2 represented by solid lines, and the information for specifying each vector (position of start point, length and inclination, or horizontal and vertical components) is used as encoded data.

Another example of n-degree curve approximation illustrated in FIG. 2 is the method contrived by the present applicant as disclosed in U.S. Pat. No. 4,511,893 (JP Laid-open No. 39963/1982). According to this technique, as will be described later, the quantity of data is compressed by storing the coordinates of a group of points P established suitably on the outline of a character, and a desired outline is approximated with an n-degree curve 3 which connects (n+1) points in succession. The graph of FIG. 2 represents an exemplary case where n=2.

The feature of the data compression based on such outline method resides in that, when reproducing a character image by decoding the compressed data thereof, the image reproduction is attainable with a variety of scale factors by executing interpolation, thinning-out or conversion of a vector scale factor.

In such prior methods mentioned above, however, there exists an essential disadvantage that an optimal result is not guaranteed with regard to the smoothness of the outline (continuity in inclination of the outline), as is obvious from the example of FIG. 1 where the start points and end points P of the individual vectors are rendered discontinuous, and also from another example of FIG. 2 where the inclination angles $\delta$ of the left and right tangential lines on the two sides of each break point $P_c$ of the n-degree curves 3 are rendered discontinuous.

In contrast therewith, the outline of a character generally has both straight and curved portions while being continuous itself and further has such contour characteristics that its first-degree derived function (inclination of outline) varies continuously with the exception of some peculiar points including an intersection of constituent lines of the character and a tapered end of a character portion called "hane".

Consequently, it is unavoidable that the data compression executed by the conventional outline method involves some problems such as difficulties in attaining satisfactory compressed data that specify the outline faithfully and also in accurately eliminating the unnaturalness (discontinuity in inclination) of the character image reproduced on the basis of such compressed data.

In an attempt to solve the problems mentioned above, the present applicant previously developed an improved method as disclosed in U.S. Pat. No. 4,542,412 (JP Laid-open No. 134745/1983).

However, the above data compression method which is a kind of outline method still has the following disadvantages.

(1) As a result of the attempt to approximate the entire sampling segments in an arbitrary block at a time, a rugged contour is prone to be formed with a deviation from the original outline at a point of connection in any region where a straight portion and a curved portion are connected to each other. And the straight-line reproducibility is deteriorated since an outline portion to be reproduced as a straight line is affected harmfully by the approximated curves in the sampling segments anterior and posterior thereto.

(2) For avoiding such drawbacks, a greater number of sampling points need to be established with the requirement of division into many polynomials to execute the approximation, whereby the quantity of data is increased eventually.

(3) Furthermore, it has also been found that due to the action of approximating the individual sampling segments in an arbitrary block at a time, when a new sampling point is established, the approximate curves in the other sampling segments are thereby affected to be eventually varied.

(4) And each time a new sampling point is established, it becomes necessary to redetermine the approximate curves with respect to the entire sampling segments in the related block, and complicated computation is required for encoding the data, whereby a considerable period of time is needed to produce the desired data.

SUMMARY OF THE INVENTION

It is an object of the present invention to provide a novel data processing apparatus based on an improved mode of outline reproduction.

Another object of the invention resides in providing a character data processing apparatus adapted to obtain satisfactory compressed data that ensure faithful reproduction of a outline despite a shortened time in computing the compressed data.

A further object of the invention is to provide a character data processing apparatus capable of achieving a sufficiently high data compression rate regardless of storage of the compressed data that reproduce the smoothness of an outline faithfully.

Further objects and features of this invention will be apparent from the detailed description of the preferred embodiment thereof with reference to the accompanying drawings.

BRIEF DESCRIPTION OF THE DRAWINGS

FIGS. 11(a)-11(c) are diagrams to explain an inclination computing method at each outline point;

PREFERRED EMBODIMENT OF THE INVENTION

Figure 1:
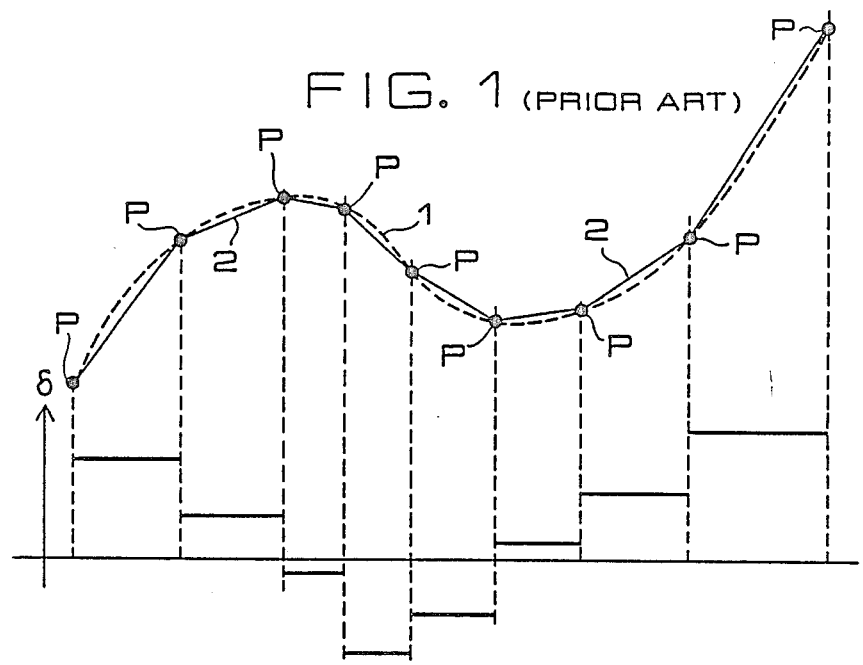
FIGS. 1 and 2 are diagrams for explaining the conventional outline method.
Figure 2:
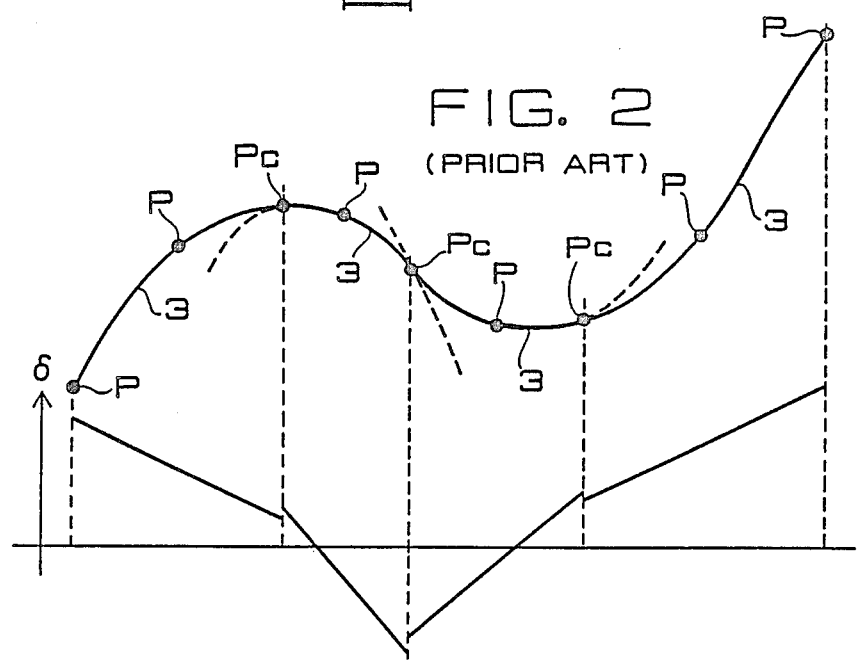
Figure 3:
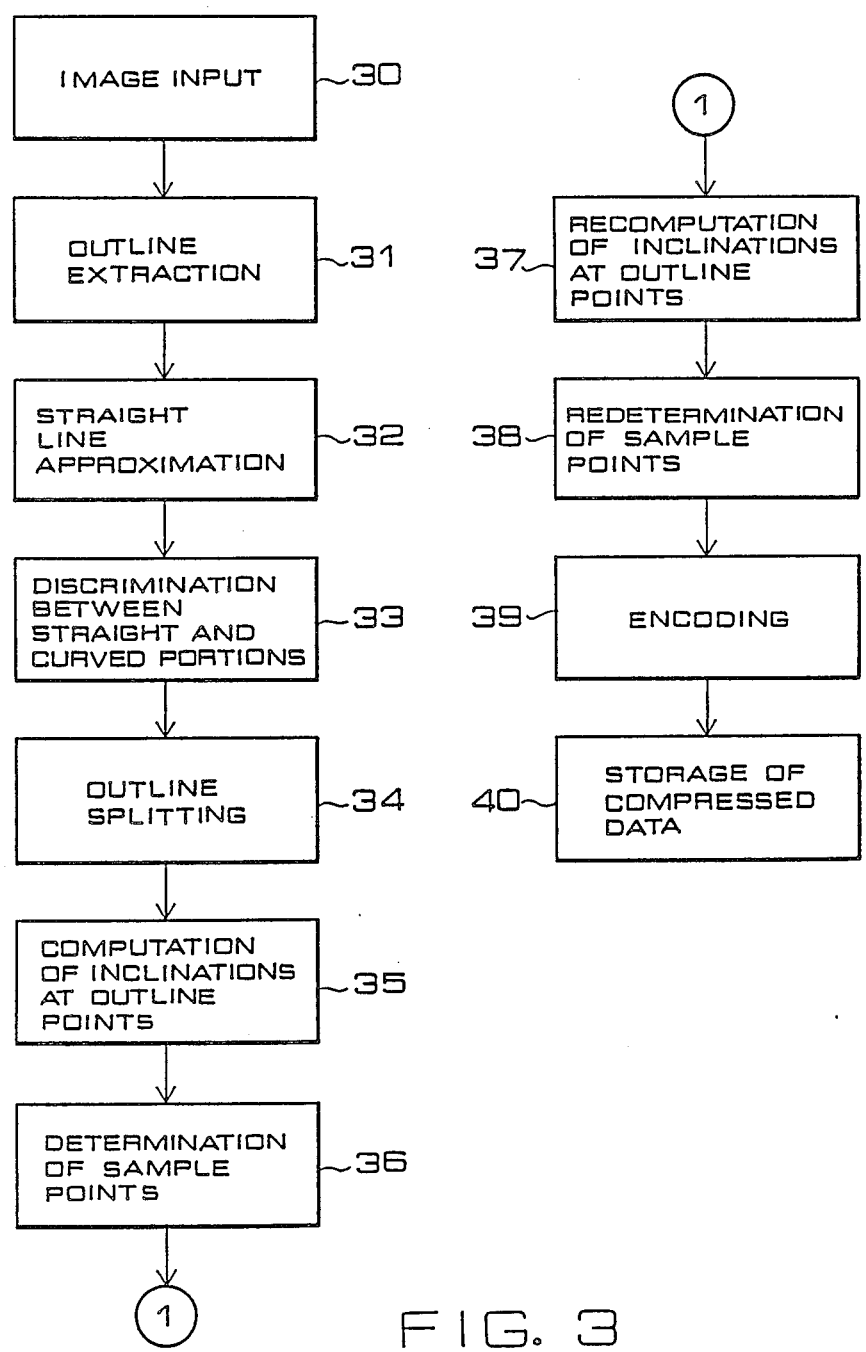
FIG. 3 is a flow chart showing the summary of operating process of an apparatus according to this invention.

At first, the summarized operation of the apparatus according to this invention will be described with reference to the flow chart shown in FIG. 3.

An input character image is resolved into dots in the form of an x-y matrix (30), and the outline of the character image thus resolved is extracted (31). Then the extracted outline is approximated with straight-line vectors in such a manner that the positional deviation of each vector from the outline becomes smaller than an allowable error (32). The approximated outline is processed for discrimination between straight portions and curved portions in accordance with the lengths of the individual vectors (33). And the outline portion recognized as the curved portion is split, when necessary, in accordance with the intersection angle of the mutually adjacent vectors (34). As a preliminary for approximating the curved outline with a curve by an cubic polynomial, the inclination is computed at each of the outline points forming the outline (35). And then the cubic polynomial is computed on the basis of such inclination and the coordinates of the start and end points of the sampling candidate segment established in the region to be approximated with a curve. Subsequently, with extension or shortening of the said sampling candidate segment, a computation is executed to define a sampling segment which becomes the longest within a range where the deviation between the outline and the cubic polynomial for approximating the said segment is maintained to be smaller than the allowable error, and the start and end points of the said segment are determined as sampling points (36). Sampling segments posterior thereto are defined sequentially in the same way as the above and, after obtaining a cubic polynomial for approximating each of such sampling segments, a first-degree derived function of each cubic polynomial is found, when necessary, to compute the inclination again at each outline point (37). Then a sampling point is determined in the same manner as the foregoing on the basis of the newly computed inclination at each outline point and the coordinates thereof, and a cubic polynomial more faithful to the outline is computed (38). The coordinates of the start point of the said straight-line sampling segment thus obtained and those of the individual curved sampling segments forming the curved portion are encoded as well as the coefficients and the degrees in the cubic polynomial (39), and then the encoded data are stored (40).

Hereinafter there will be described the summary of construction of one embodiment according to this invention with reference to FIG. 4.

Figure 4:
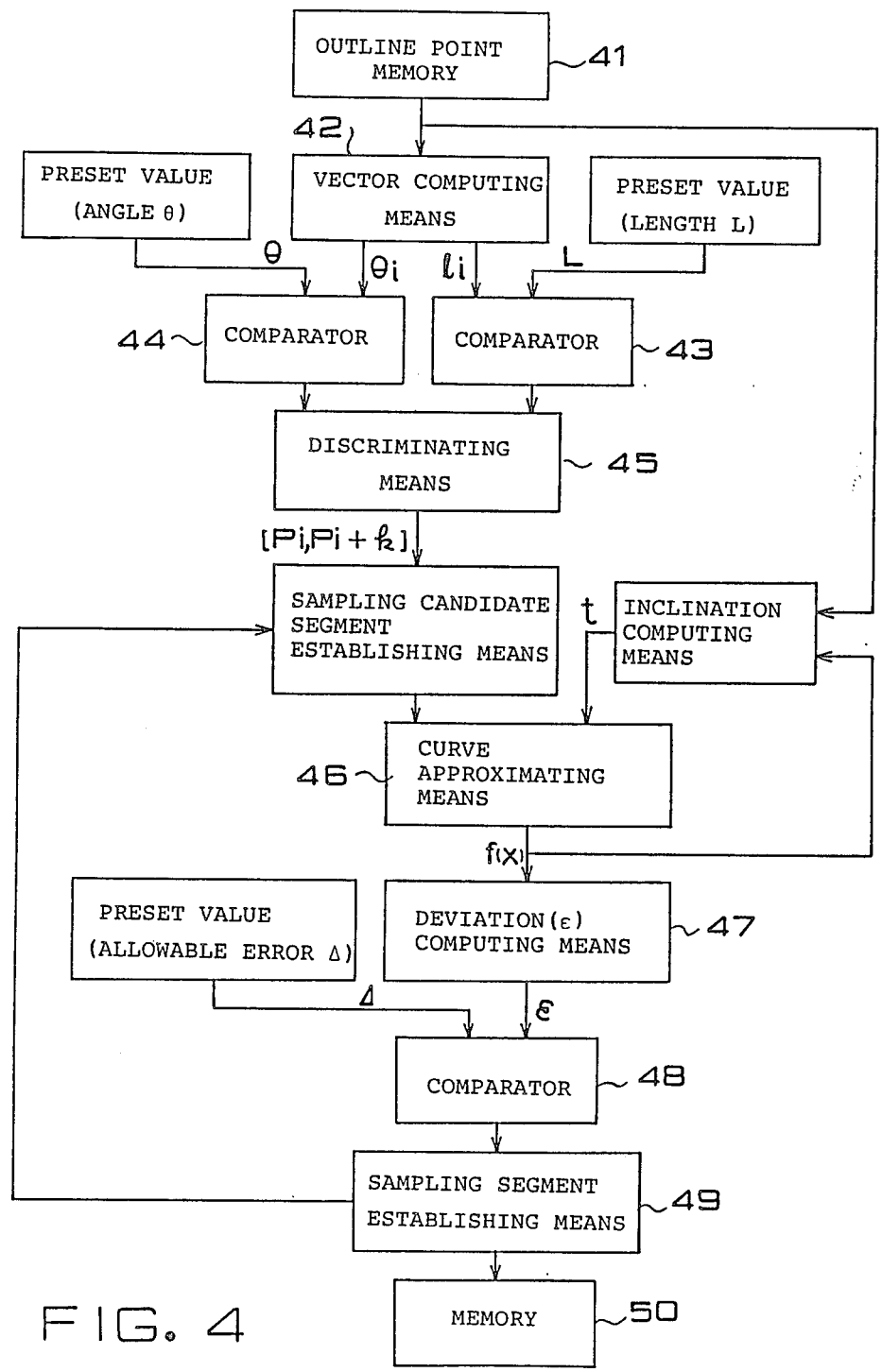
FIG. 4 is a block diagram showing the summary of construction of an apparatus according to this invention.

In FIG. 4, reference numeral 41 depicts a memory means which stores the position of an outline point $Q_j$ of a character image, 42 shows a vector computing means which obtains length of a vector $V_i$ having a start point $P_i$ and an end point $P_{i+1}$ on any points among a plurality of outline points $Q_j$ constituting a character image outline, and deviation between the vector and the outline points, and further obtaining the vector $V_i$ which is so established as to become maximum in length $l_i$ while the deviation is maintained to be less than a given allowable value, 43 illustrates a comparator which compares the length $l_i$ of the vector $V_i$ with a preset length L, 44 indicates a comparator which compares an intersection angle $\theta_i$ of the vector $V_i$ and a vector $V_{i-1}$ adjacent to the vector $V_i$ with a preset angle $\theta$, 45 shows a discriminating means which identifies an outline segment [$P_i$, $P_{i+1}$] approximated with the vector $V_i$ with a straight portion when the result of the comparison is $l_i > L$, further identifying the outline segment [$P_i$, $P_{i+1}$] with a curved portion when the result of the comparison is $l_i \leq L$, then repeating said comparison with respect to the next vector upon $\theta_i \geq \theta$, and identifying the preceding outline segments [$P_i$, $P_{i+k}$] with a single continuous curved portion upon change of the result to $l_{i+k} > L$ or $\theta_{i+k} < \theta$ with a vector $V_{i+k}$, 46 depicts a curve approximating means which establishes a sampling segment in the outline segments [$P_i$, $P_{i+k}$] of the curved portion, selecting the outline start point $Q_j$ as a first sampling point, then establishing a sampling candidate segment $[Q_j, Q_{j+r}]$ while selecting an arbitrary outline point $Q_{j+r}$ on said outline as a sampling point candidate, subsequently computing an cubic polynomial f(x) to approximate said sampling candidate segment $[Q_j, Q_{j+r}]$ with a curved line on the basis of the coordinates $(x_j, y_j)$ and $(x_{j+r}, y_{j+r})$ of the sampling point $Q_j$ and the sampling point candidate $Q_{j+r}$ and also the inclinations $t_j$ and $t_{j+r}$ thereof, 47 indicates a deviation computing means which obtains the deviation $\epsilon$ between the cubic polynomial f(x) and each of the outline points on said sampling candidate segment, 48 illustrates a comparator which compares the obtained deviation $\epsilon$ with an allowable error $\Delta$, 49 depicts a sampling segment establishing means which shifts a preset sampling point candidate on the basis of the comparison result, then similarly comparing the deviation $\epsilon$ with the allowable error $\Delta$ with respect to the newly selected sampling candidate segment, establishing the sampling point candidate as the next sampling point in case that the comparison result meets $\epsilon \leq \Delta$ with respect to all outline points and that the sampling candidate segment becomes maximum, and thereafter establishing sampling segments sequentially over the entire outline segments $[P_i, P_{i+k}]$ which are identified with said continuous curved portion by making said newly established sampling point as a start point of the next sampling candidate segment; and 50 shows a memory which stores the start point coordinates of the straight portion, and the start point coordinates of each sampling segment established on the curved portion, and the coefficient and the degree of said cubic polynomial which approximates each sampling segment.

Hereinafter the data processing performed in each step will be described in detail.

[Image input 30]

A character or pictorial image is resolved into x-y matrix dots through raster scanning by means of a scanner or the like, and bit pattern data acquired therefrom is fed as character data to be processed.

[Outline extraction 31]

There are obtained dot positions (outline points Q) where the binary data corresponding to the resolved character data change from "0" to "1" or from "1" to "0" in the x- or y-direction. The obtained positions of the outline points are stored in the outline point memory 41.

Figure 5:
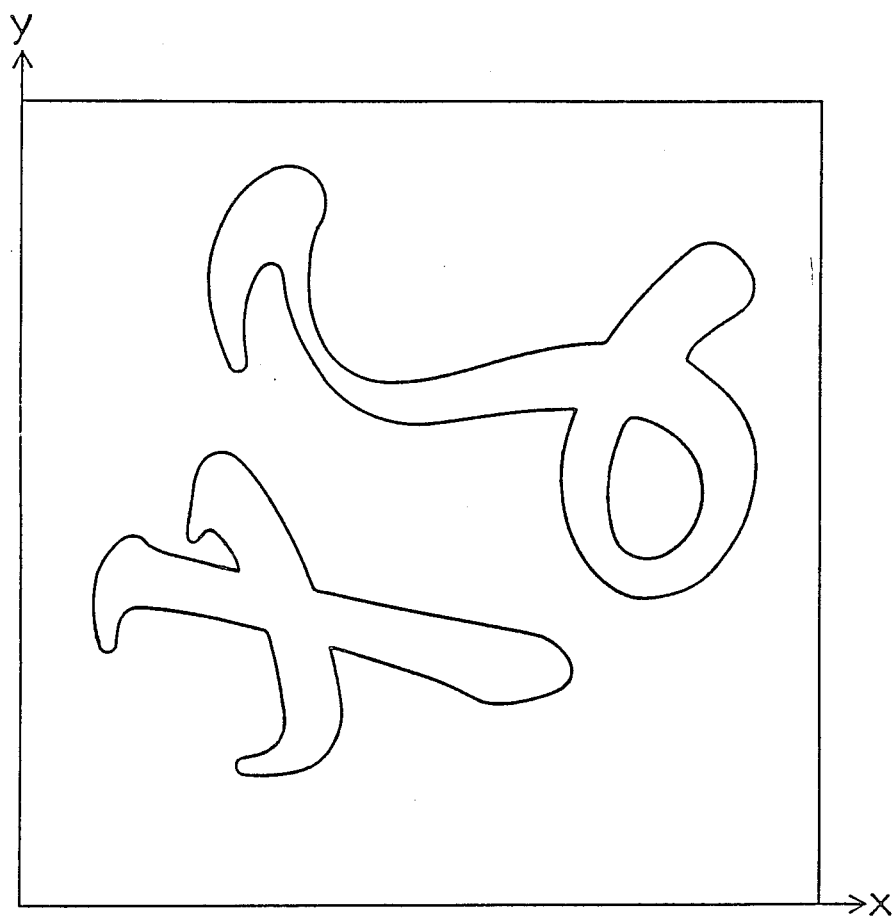
FIG. 5 is a diagram showing an example of character outlines.

FIG. 5 shows an example of the character outline obtained as the above in which a Japanese Hiragana character "あ" is illustrated.

A raster image is made between the start point of scan and the end point thereof in case that a character image is reproduced in raster scanning system. Therefore there is not required any information on the outline parallel to Y axis (raster scanning direction).

Figure 6:
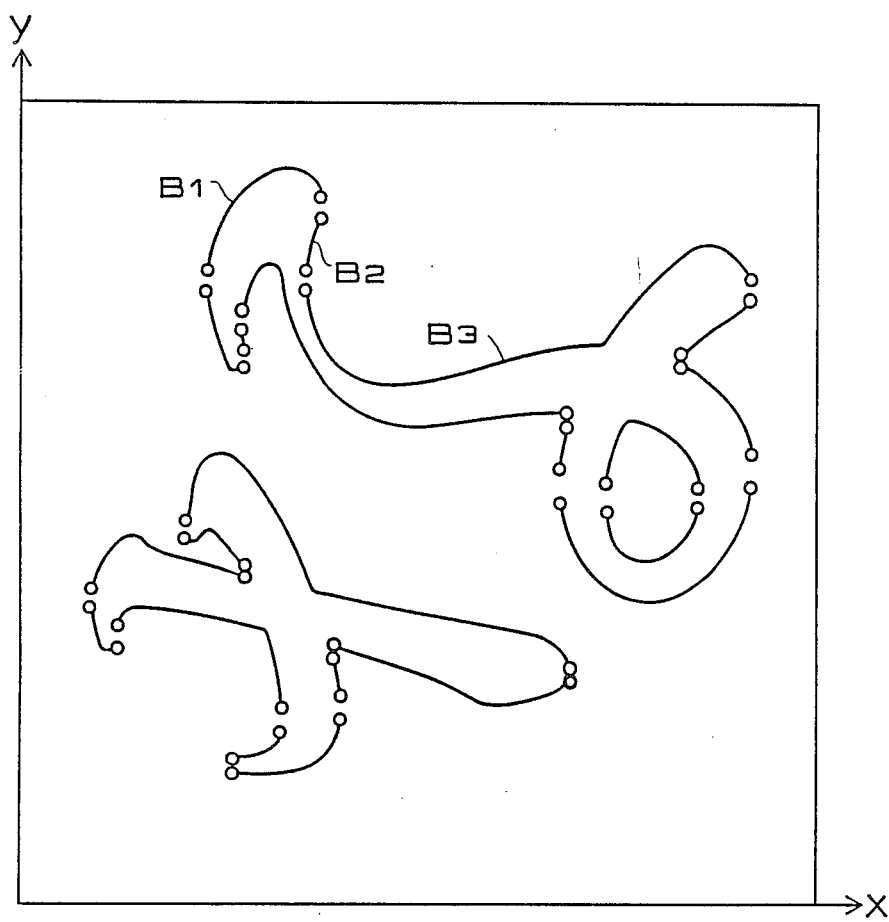
FIG. 6 is a diagram showing an example in which the character outlines shown in FIG. 5 are split into a plurality of blocks.

FIG. 6 shows the character outline shown in FIG. 5, in which portions parallel to Y axis are excluded. In FIG. 6, the marks "0" show the start and end points of each outline and the space defined by the marks is an excluded portion. It is obvious from this figure that the value of x axis of coordinates merely increases or decreases. Namely it is a univalent function (y) involving x as a variable. Thus the outline of FIG. 6 can be obtained by continuously obtaining the segments (blocks $B_1$, $B_2$, $B_3$ ...) in which the x-coordinate values of the outline increase or decrease monotonously in respect to the outlines of FIG. 5.

[Straight line approximation 32]

In the vector computing means 42 in FIG. 4, straight line approximation is performed with a multiplicity of vectors $V_i$ so established that the deviation thereof from the outline is maintained to be smaller than a predetermined allowable error and the length $l_i$ becomes maximal.

Figure 7:
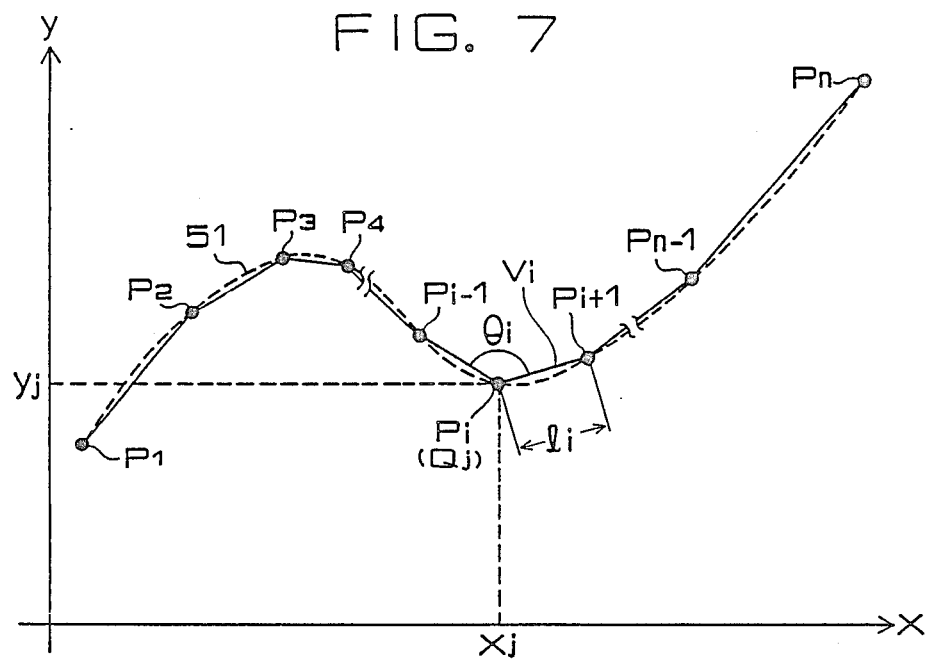
FIG. 7 is a diagram graphically showing straight line approximation.

For example, FIG. 7 shows an exemplary straight line approximation executed for an outline 51, which is represented by a dotted line, in a block $[P_i, P_n]$ with a set of vectors $V_i$ (where i=1 to n−1). The coordinates $(x_j, y_j)$ of outline point $Q_j$ (where j=1 to m) corresponding to break point $P_i$ (where i=1 to n) of the vectors $V_i$ are stored in a break point coordinate storing part 60 shown in FIG. 8.

[Discrimination between straight portion and curved portion of outline 33]

As mentioned already, the outline of a character generally has both straight portions and curved portions. In U.S. Pat. No. 4,542,412; Fuse filed by the present applicant, due to the attempt for approximating the entire outline of one block at a time, a large number of sampling points need to be established in the vicinity of break points in any region where straight portions and curved portions are mutually joined, and further division into many approximate expressions is necessary, so that the quantity of data in this region comes to increase as a result to bring about a disadvantage of reduction in the compression rate.

In view of the circumstances described above, the present invention has been contrived in order to eliminate such problems by first discriminating between the straight portion and the curved portion of the vector-approximated outline segment in accordance with the lengths $l_i$ of the respective vectors obtained by the aforesaid straight line approximation, and then processing the straight portion and the curved portion individually, hence achieving a satisfactory image even when the character has a complicated outline.

Figure 8:
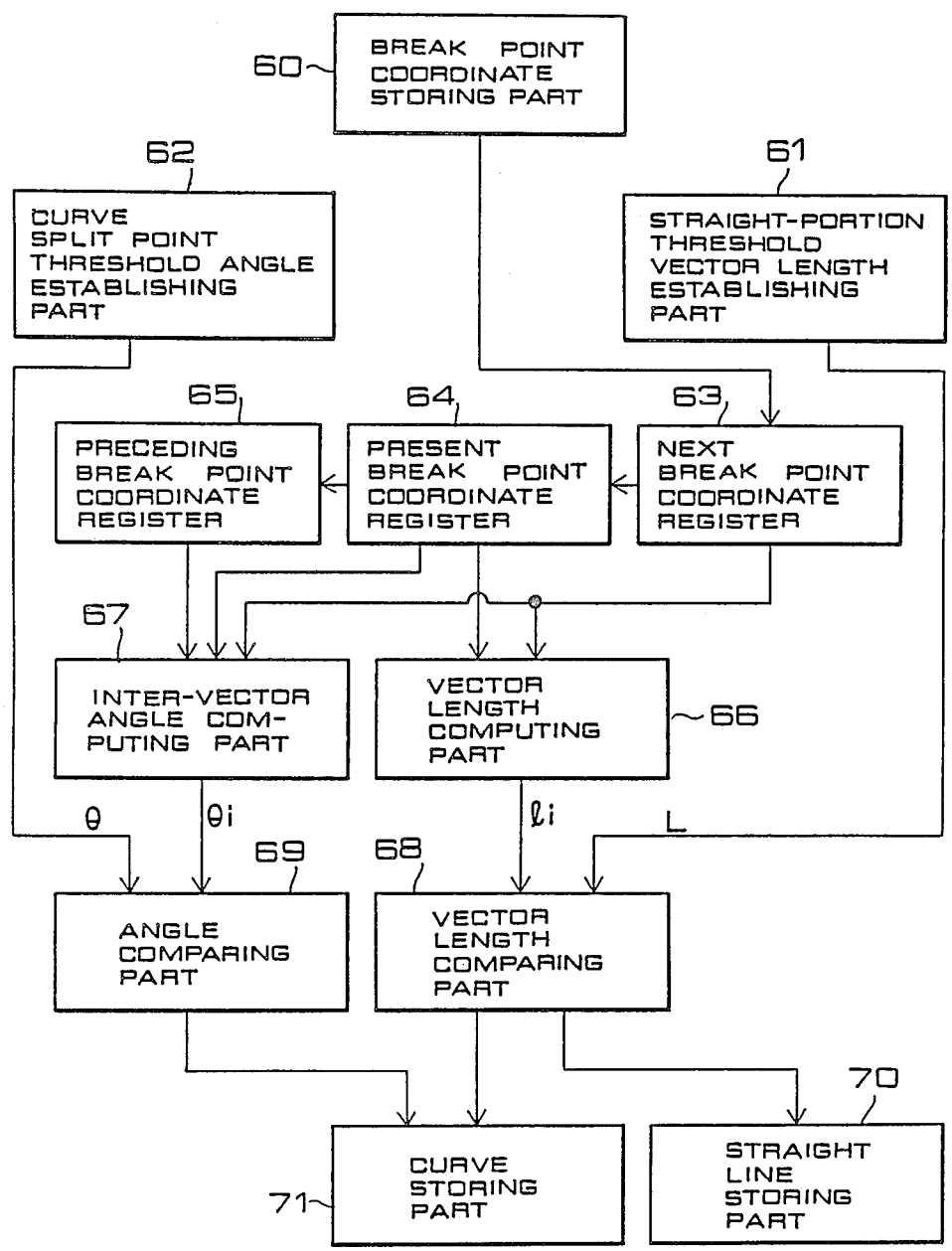
FIG. 8 is a block diagram showing one embodiment of construction contrived to carry out discrimination between a straight portion and a curved portion of an outline.
Figure 9:
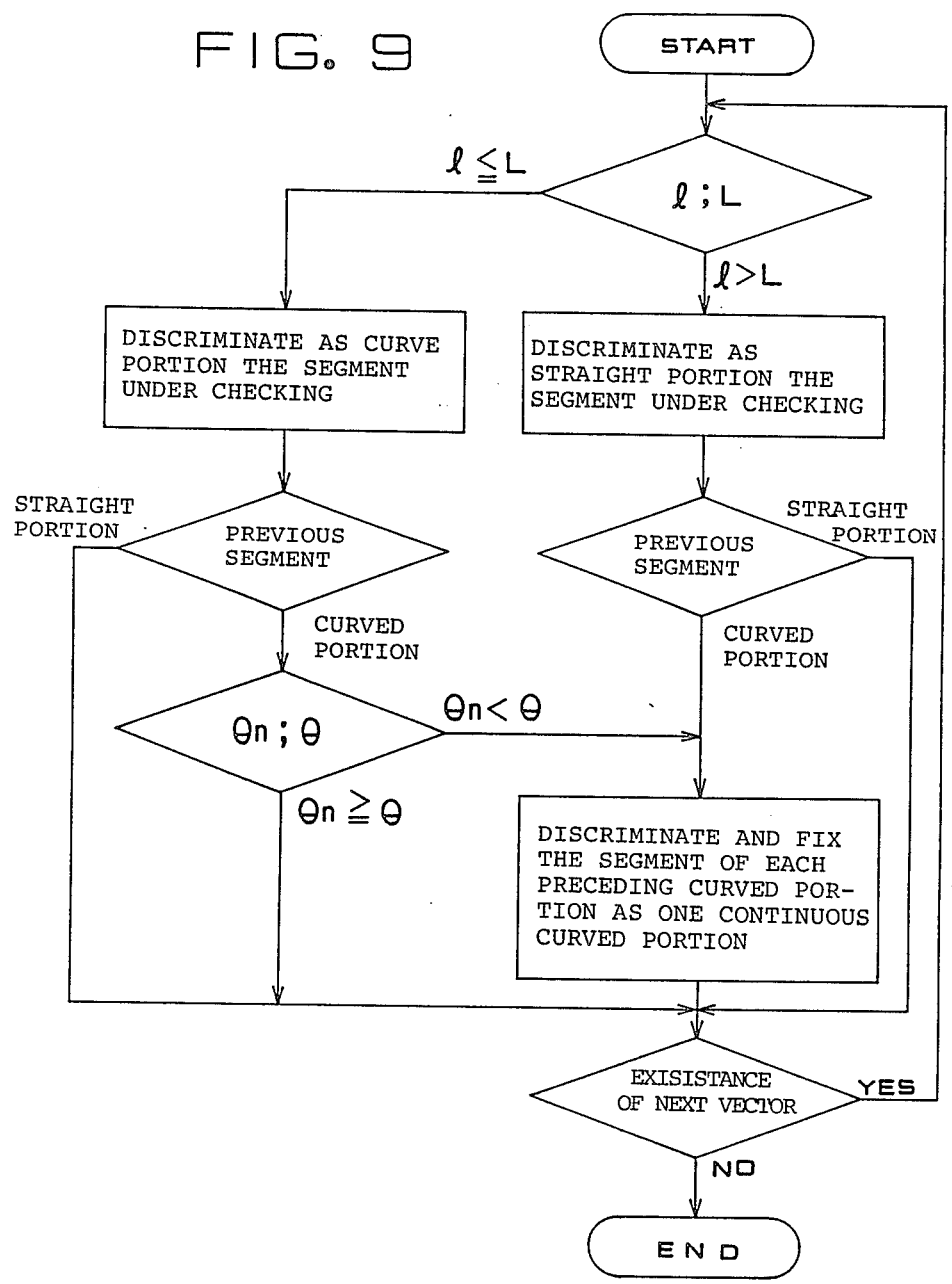
FIG. 9 is a flow chart detailedly showing main processing steps in the construction of FIG. 8.

FIG. 8 is a block diagram of an exemplary constitution designed to implement the discrimination between a straight portion and a curved portion of a character outline, and FIG. 9 is a diagram detailedly showing a main portion of the operating process in the construction in FIG. 8. These figures show ones corresponding to the vector computing means 42, comparators 43, 44 and discriminating means 45 as shown in FIG. 4. In FIG. 8, there are shown a break point coordinate storing part 60 for storing the break points of each block obtained by the straight line approximation (32); a straight-portion threshold vector length establishing part 61 for previously establishing a threshold length L to discriminate a vector; a curve split point threshold angle establishing part 62 for previously establishing a threshold angle $\theta$ to discriminate a curve splitting point; a next break point coordinate register 63 for holding the coordinates of an (i+1)th break point $P_{i+1}$, i.e. the coordinates $(x_{j+s}, y_{j+s})$ of an outline point $Q_{j+s}$ corresponding to the break point $P_{i+1}$; a present break point coordinate register 64 for holding the coordinates $(x_j, y_j)$ of an outline point $Q_j$ corresponding to an i-th break point $P_i$; a preceding break point coordinate register 65 for holding the coordinates $(x_{j-u}, y_{j-u})$ of an outline point $Q_{j-u}$ corresponding to an (i−1)th break point $P_{i-1}$; a vector length computing part 66 for computing the length $l_i$ of a vector $V_i$ from the respective coordinates held in the next break point coordinate register 63 and the present break point coordinate register 64; an inter-vector angle computing part 67 for computing the inter-vector angle $\theta_i$ at the break point $P_i$ from the respective coordinates held in the registers 63, 64 and 65; a vector length comparing part 68 for comparing the vector length L established by the part 61 with the vector length $l_i$ computed by the part 66; an angle comparing part 69 for comparing the curve split point threshold angle $\theta$ established by the part 62 with the inter-vector angle $\theta_i$ computed by the part 67; a straight line portion storing part 70 for storing a straight segment in accordance with the result of comparison performed by the vector length comparing part 68; and a curve portion storing part 71 for storing a curved segment in accordance with the results of comparison performed by the vector length comparing part 68, or by the vector length comparing part 68 and the angle comparing part 69.

In the above embodiment, the operation is performed in the following manner. First, a vector length L and an angle $\theta$ are established respectively in the straight-portion threshold vector length establishing part 61 and the curve split point threshold angle establishing part 62. Subsequently, the coordinates of start point $P_i$ of one block $[P_i, P_n]$ are transferred from the break point coordinate storing part 60 to the next break point coordinate register 63. In this stage, since no coordinate data is stored in the present break point coordinate register 64, it is impossible to obtain the vector length in the computing part 66 which will be described later. Then the break point coordinates stored in the next break point coordinate register 63 are shifted to the present break point coordinate register 64, and the coordinates of a next break point $P_2$ are newly stored in the register 63. Thereafter, the coordinates stored in the present break point coordinate register 64 are shifted to and stored in the preceding break point coordinate register 65, and the coordinates stored in the next break point coordinate register 63 are shifted to and stored in the present break point coordinate register 64. And subsequently the next break point coordinates obtained from the break point coordinate storing part 60 are stored in the register 63.

The vector length computing part 66 computes a vector length $l_i = \sqrt{(x_{j+s}-x_j)^2 + (y_{j+s}-y_j)^2}$ from the coordinates $(x_{j+s}, y_{j+s})$ of the (i+1)th break point $P_{i+1}$ in the next break point coordinate register 63 and the coordinates $(x_j, y_j)$ of the i-th break point $P_i$ in the present break point coordinate register 64. The vector length $l_i$ thus computed is compared by the vector length comparing part 68 with the vector length L previously established by the straight-portion threshold vector length establishing part 61. And when $l_i > L$, the outline segment $[P_i, P_{i+1}]$ approximated by the said vector $V_i$ is recognized as a straight portion, and the coordinates of the start and end points thereof are stored in the straight line storing part 70 as the information relative to one straight portion.

In the case of $l_i \leq L$, the outline segment $(P_i, P_{i+1}]$ is recognized as a curved portion and, after the coordinates of start and end points of the segment $[P_i, P_{i+1}]$ are stored in the curve storing part 71 as the information relative to the curved portion, the next segment $[P_{i+1}, P_{i+2}]$ is discriminated. And if this segment $[P_{i+1}, P_{i+2}]$ is also a curved portion, the segments $[P_i, P_{i+2}]$ recognized heretofore as curved portions are joined together to form a single continuous curved portion, and the coordinates of its start and end points are stored in the curve storing part 71 as the information relative to one curved portion.

The foregoing comparison is repeatedly executed until the next outline segment is recognized as a straight portion and, when the result of such comparison is changed to $l_{i+k} > L$ with a vector $V_{i+k}$ the coordinates of start and end points corresponding to the preceding outline segments $[P_i, P_{i+k}]$ and stored already in the curve storing part 71 are fixed as the information relative to one curved portion.

As mentioned hereinabove, when the information representing one straight portion or one curved portion is obtained, the foregoing recognition is repeatedly executed with respect to the successive vectors, and the data of the straight and curved portions constituting the arbitrary block $(P_i, P_n]$ are held respectively in the storing parts 70 and 71. And thereafter discrimination is further executed with regard to the entire blocks that constitute one character.

[Outline splitting 34]

Meanwhile, in the inter-vector angle computing part 67, the respective coordinates $(x_{j-u}, y_{j-u})$, $(x_j, y_j)$ and $(x_{j+s}, y_{j+s})$ of the break points $P_{i-1}$, $P_i$ and $P_{i+1}$ are read out from the next break point coordinate register 63, the present break point coordinate register 64 and the preceding break point coordinate register 65, and subsequently the inter-vector angle $\theta_i$ (intersection angle of vectors $V_i$ and $V_{i-1}$ adjacent to each other) shown in FIG. 7 is computed. The angle $\theta_i$ thus obtained is compared by the angle comparing part 69 with the curve split point threshold angle $\theta$ established previously in the part 62. And when the result of such comparison is $\theta_i < \theta$, a curve split signal is fed from the angle comparing part 69 to the curve storing part 71.

In implementing the present invention, an instruction is provided in advance for either operating the curve storing part 71 in response to a curve split signal or neglecting such curve split signal. In case the instruction is so prepared as to neglect a curve split signal, the curve storing part 71 faithfully performs the operation described previously in connection with [Discrimination between straight portion and curved portion of outline (33)].

In another case where the instruction is so prepared as to operate the curve storing part 71 in response to a curve split signal, if curved portions are recognized in succession from a vector $V_i$ and the result of comparison is changed to $\theta_{i+k} < \theta$ with a vector $V_{i+k}$, the curve split signal is fed to the curve storing part 71. Then a break point $P_{i+k}$ is newly recognized as a curve split point by the curve storing part 71, and the coordinates of start and end points corresponding to the preceding outline segment $[P_i, P_{i+k}]$ and stored already in the curve storing part 71 are fixed as the information relative to one curved portion.

In most cases the aforementioned intersection of character constituent lines or any peculiar portion such as a tapered end thereof called "hane" is usually recognized as a curve split point. Differing from U.S. Pat. No. 4,542,412; Fuse where a long time is required for processing the data to determine a desired approximate curve due to the existence of many break points in the vicinity of such peculiar portion, the present invention is advantageous since the outline is divided at the curve split point thus specified, and a curve approximation is executed individually for each of segments anterior and posterior to the curve split point, hence expediting the processing to shorten the time required and facilitating the determination of the approximate curve.

Figure 10:
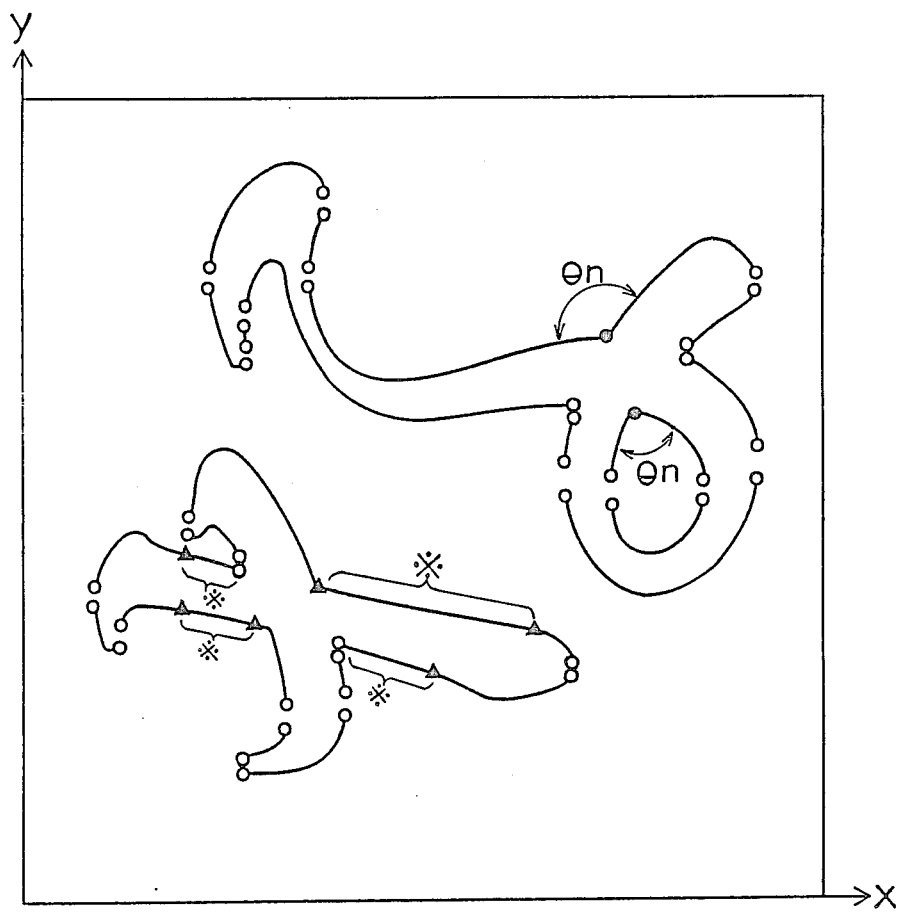
FIG. 10 is a diagram showing the results of discriminating a straight portion and a curve portion.

FIG. 10 illustrates an exemplary character obtained by processing the outline of FIG. 6 in the aforesaid procedure from the straight line approximation (32) through the outline splitting (34).

In the figure, a mark "○" denotes a start point and an end point of each block; a mark "▲" denotes a break point obtained by descrimination between straight line and curved line; and a mark "●" denotes a curve split point. A straight portion is marked with ⁕, while a curved portion is not marked with any symbol. Two curve splitting points as shown in the figure are established since the intersection angle $\theta_n$ is less than the given discrimination angle $\theta$.

[Computation of inclinations at outline points 35]

In approximating the outline shape of the computed curved portion by means of cubic polynomials, the expressions are determined definitely when the coordinates of two points and the inclinations thereat are specified. In this case, therefore, it is necessary first to obtain the inclination at each outline point on the outline.

According to the embodiment of the present invention, the inclination at each of desired outline points is previously computed and stored by extracting a predetermined number of outline points anterior and posterior to the desired outline point, and finding the respective inclinations of the line portions which connect the desired outline point, whose inclination is to be computed, with the individual extracted points.

Now the process of computing the inclination at each outline point according to this invention will be described in detail with reference to an exemplary curved portion shown in FIG. 11.

First, in the case of computing an inclination $t_1$ at an outline point $Q_1$ (start point of curved portion) in FIG. 11(a), an arbitrary number of outline points existent posterior to the outline point $Q_1$ are extracted, then the respective inclinations of the line portions between the outline point $Q_1$ and the other outline points are computed, and the inclination $t_1$ at the outline point $Q_1$ is computed on the basis of the respective inclinations of the line segments by the expressions which will be described later.

In an exemplary case of finding the inclination with extraction of two outline points posterior to the outline point $Q_1$ whose inclination is to be obtained, first the inclination $m_{12}$ of a line portion $\overline{Q_1 Q_2}$ and the inclination $m_{13}$ of a line portion $\overline{Q_1 Q_3}$ are computed. The line portion inclination $m_{12}$ can be obtained from the coordinates $(x_1, y_1)$ and $(x_2, y_2)$ of the two points as $$m_{12}=(y_2-y_1)/(x_2-x_1)$$

Meanwhile, the inclination $m_{13}$ is also obtainable in the same manner.

On the basis of the line portion inclinations $m_{12}$ and $m_{13}$, the inclination $t_1$ at the outline point $Q_1$ is determined by the equation:

$$t_1=\tan\{(\tan^{-1} m_{12}+\tan^{-1} m_{13})/2\}$$

Now a description will be given on an exemplary case of computing an inclination $t_2$ at the next outline point $Q_2$ with reference to FIG. 11(b).

In this case, a predetermined number of outline points existing anterior and posterior to the point $Q_2$ are extracted, then the respective inclinations of the line segments between the outline point $Q_2$ and the individual extracted points are computed, and the inclination $t_2$ at the outline point $Q_2$ is obtained therefrom.

For example, in the case of finding the inclination with extraction of two points relative to the desired outline point, merely a single point $Q_1$ can be extracted on the side anterior to outline point $Q_2$. Therefore, one anterior point and one posterior point are extracted with respect to the outline point $Q_2$, and the inclination $t_2$ is determined by the following equation:

$$t_2=\tan\{(\tan^{-1} m_{12}+\tan^{-1} m_{23})/2\}$$

In such a case where the number of outline points extractable is less than a designated value, a maximum number of points selectable within the designated range are extracted to compute the inclination.

In the next case of computing an inclination $t_3$ at an outline point $Q_3$ as shown in FIG. 11(c), the designated number of outline points are existent posterior and anterior to the point $Q_3$. Therefore, the inclinations $m_{13}$, $m_{23}$, $m_{34}$ and $m_{35}$ of the line segments between the outline point $Q_3$ and the other outline points are computed, and the inclination $t_3$ at the outline point $Q_3$ is determined by the following equation:

$$t_3=\tan\{(\tan^{-1} m_{13}+\tan^{-1} m_{23}+\tan^{-1} m_{34}+\tan^{-1} m_{35})/4\}$$

Thereafter the inclination at each outline point is computed by the same procedure as the above, wherein the inclination $t_n$ at the end point $Q_n$ of the curved portion is computed similarly as in the case of obtaining the inclination at the start point $Q_1$ shown in FIG. 11(a), or the inclination $t_{n-1}$ at the outline point $Q_{n-1}$ adjacent the point $Q_n$ is computed similarly as in the case of obtaining the inclination at the outline point $Q_2$ adjacent the point $Q_1$ shown in FIG. 11(b).

In this manner, computing the inclination at each outline point is executed by extracting merely a predetermined number of associated outline points anterior and posterior to the desired outline point. The above explanation is concerned with an example where the predetermined number is two.

[Determination of sampling points 36]

Figure 12:
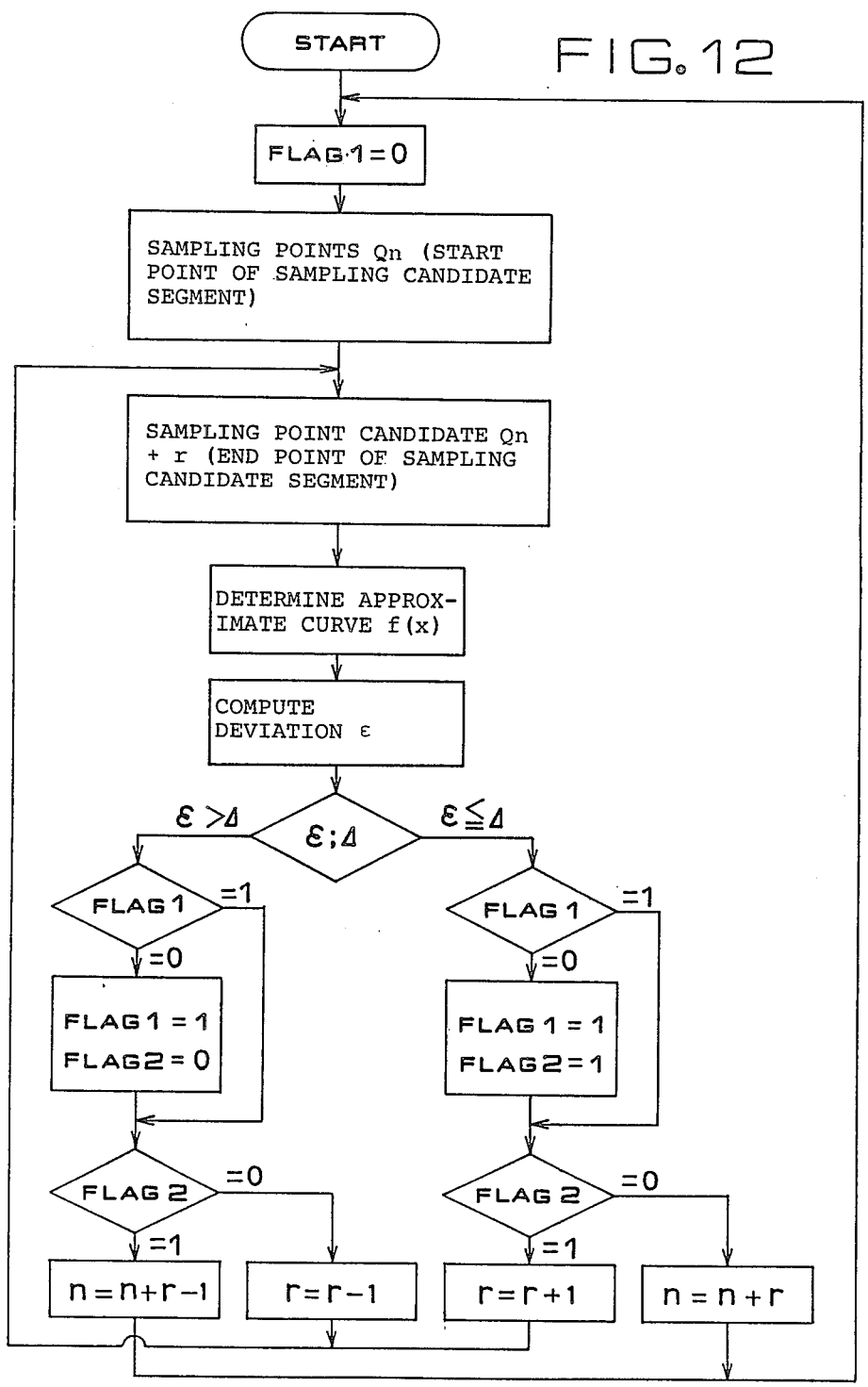
FIG. 12 is a flow chart showing an establishing process of a sampling segment.

As described above, there is obtained the inclination at each of the outline points constituting the curved portion so that a sampling segment is established on the outline corresponding to the curved portion. The establishment of the sampling segment is performed by means of a curve approximating means 46, deviation computing means 47, comparator 48 and sampling segment establishing means 49. FIG. 12 is a diagram showing this operating process.

At first, two outline points $Q_j$, $Q_{j+r}$ are selected in turn by way of the following process to establish a sampling segment. (refer to FIG. 13)

In the following description, the anterior outline point $Q_j$ is termed a sampling point while the posterior outline point $Q_{j+r}$ is termed a sampling point candidate. And the segment defined by such two points forming a start point and an end point respectively is termed a sampling candidate segment $[Q_j, Q_{j+r}]$.

The sampling point $Q_j$ is established under the initial condition at the start point of the curved portion, while the sampling point candidate $Q_{j+r}$ is established at a position spaced apart from the sampling point $Q_j$ by a distance corresponding to the number r of outline points.

First, the coefficients and degrees of a cubic polynomial f(x) passing through the two points are computed on the basis of the coordinates $(x_j, y_j)$, $(x_{j+r}, y_{j+r})$ and inclinations $t_j$, $t_{j+r}$ of the sampling point $Q_j$ and the sampling point candidate $Q_{j+r}$, and comparison is executed to find whether each of the deviation $\epsilon$ between the entire outline points existent in the sampling candidate segment $[Q_j, Q_{j+r}]$ and the approximate curve obtained by the aforesaid cubic polynomial is smaller than a predetermined allowable error $\Delta$, whereby the said approximate curve is judged to be proper or not.

Supposing now that the result of comparison is $\epsilon \leq \Delta$ at every outline point in the sampling candidate segment $[Q_j, Q_{j+r}]$, the approximate curve obtained is judged to be allowable.

The longer the segment representable by a single approximate curve, that is, the less the number of approximate curves needed to represent a given outline, the less the quantity of data required to consequently achieve efficient compression.

With respect to the sampling candidate segment $[Q_j, Q_{j+r}]$ determined by using the initially established outline point $Q_{j+r}$ as a sampling point candidate, each deviation $\epsilon$ between the approximate curve obtained as mentioned above and each of the outline points in the sampling candidate segment $[Q_j, Q_{j+r}]$ is computed and then compared with the allowable error $\Delta$, and when every result of such comparison is $\epsilon \leq \Delta$, further comparison is executed while the outline point $Q_{j+r+1}$ adjacent to the present sampling point candidate $Q_{j+r}$ is selected as a new sampling point candidate. Thereafter, with sequential renewal of the sampling point candidate, the comparison is repeated until at least one result thereof becomes $\epsilon > \Delta$. And when at least one result has become $\epsilon > \Delta$ at an outline point $Q_{j+r+p}$, an outline point $Q_{j+r+p-1}$ immediately anterior thereto is set as a second sampling point to establish a sampling segment $[Q_j, Q_{j+r+p-1}]$, and an approximate curve in this sampling segment $[Q_j, Q_{j+r+p-1}]$ is determined to be one of approximate curves needed to represent the given outline.

Meanwhile, with respect to the sampling candidate segment $[Q_j, Q_{j+r}]$ determined by using the initially established outline point $Q_{j+r}$ as a sampling point candidate, a deviation $\epsilon$ between the approximate curve obtained as mentioned above and each of the outline points in the sampling candidate segment $[Q_j, Q_{j+r}]$ is computed and then compared with the allowable error $\Delta$, and when at least one result of such comparison is $\epsilon > \Delta$ further comparison is executed while the outline point $Q_{j+r-1}$ adjacent to the present sampling point candidate $Q_{j+r}$ is selected as a new sampling point candidate. Thereafter, with sequential renewal of the sampling point candidate, the comparison is repeated until every result thereof becomes $\epsilon \leq \Delta$. And when every result has become $\epsilon \leq \Delta$ at an outline point $Q_{j+r-p}$, the sampling point candidate $Q_{j+r-p}$ is selected as a second sampling point to establish a sampling segment $[Q_j, Q_{j+r-p}]$, and an approximate curve in the sampling segment $[Q_j, Q_{j+r-p}]$ is determined to be one of approximate curves needed to represent the given outline.

The processing mentioned above determines that a sampling segment is the longest where the deviation $\epsilon$ is within the limit of an allowable error $\Delta$, and thus the entire outline is divided into sampling segments. And the outline is approximated according to cubic polynomials by such sampling segments.

Hereinafter the procedure of computing the approximate curve and the deviation will be described with reference to FIG. 13.

Figure 13A:
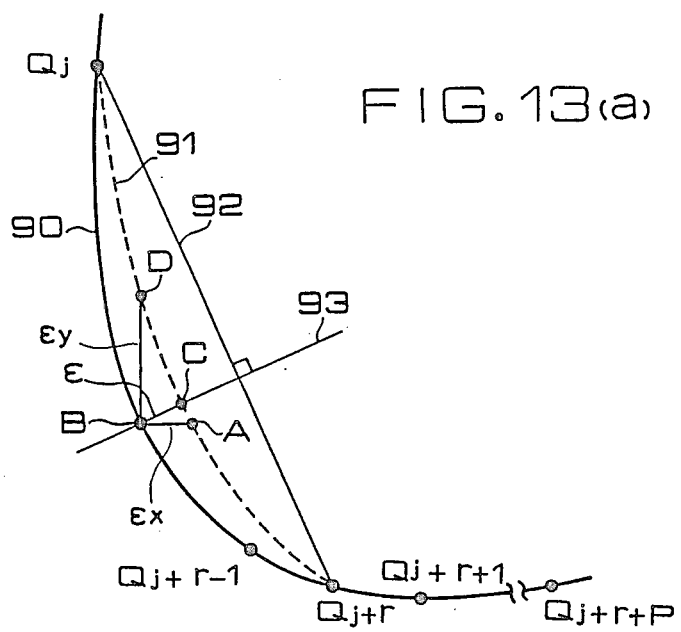
FIGS. 13(a) and 13(b) are diagrams to explain the sampling point determining method.

In FIG. 13(a), there are shown an outline 90, an outline point B on the outline 90, an approximate curve 91 of a cubic polynomial f(x), a straight line 92 between a start point $Q_j$ and an end point $Q_{j+r}$ of a sampling candidate segment $[Q_j, Q_{j+r}]$, a perpendicular 93 extending from the point B to the straight line 92, an intersection C of an approximate curve 91 and the perpendicular 93, a deviation $\epsilon_x$ designated by BA in the x-direction between the outline 90 and the approximate curve 91, a deviation $\epsilon$ designated by BC between the outline 90 and the approximate curve 91, and a deviation $\epsilon_y$ designated by BD in the y-direction between the outline 90 and the approximate curve 91.

Inclinations $t_j$ and $t_{j+r}$ of the start point $Q_j$ and the sampling point candidate $Q_{j+r}$ and also coordinate values $(x_j, y_j)$ and $(x_{j+r}, y_{j+r})$ previously computed are introduced into the following third-degree equation.

$$f(x) = y_j + b_j(x - x_j) + c_j(x - x_j)^2 + d_j(x - x_j)^3$$
$$b_j = t_j$$
$$c_j = \frac{3(y_{j+r} - y_j)/(x_{j+r} - x_j) - 2t_j - t_{j+r}}{x_{j+r} - x_j}$$
$$d_j = \frac{t_j + t_{j+r} - 2(y_{j+r} - y_j)/(x_{j+r} - x_j)}{(x_{j+r} - x_j)^2}$$

Subsequently to determination of the approximate curve in the manner mentioned, a deviation $\epsilon$ between the approximate curve and each outline point is computed.

Figure 13B:
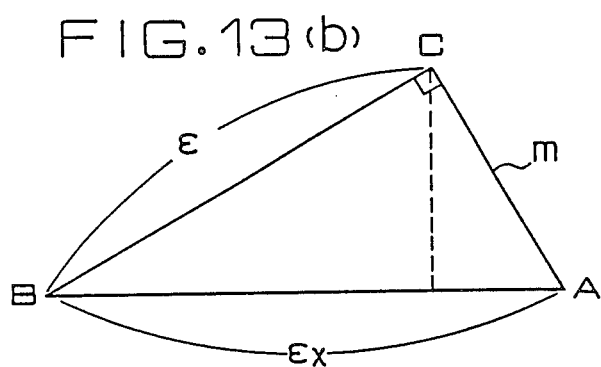

FIG. 13(b) is an enlarged view of the deviation $\epsilon$ between the outline 90 and the approximate curve 91 shown in FIG. 13(a). Supposing now that a line segment CA is parallel with a straight line 92, the inclination of the straight line 92 is considered to be equal to the inclination m of the line portion CA.

And when $|m| > 1$ as shown, the deviation $\epsilon_x$ in the x-direction between the point B and the approximate curve 91 is computed, so that the desired deviation $\epsilon$ can be obtained as $$\epsilon = \frac{m}{\sqrt{m^2 + 1}} \epsilon_x$$

Although not shown, when $|m| \leq 1$, the desired deviation $\epsilon$ can be obtained similarly as $$\epsilon = \frac{1}{\sqrt{m^2 + 1}} \epsilon_y.$$

In the exemplary case mentioned above, the process is so carried out that when the deviation $\epsilon$ has exceeded the allowable error within the next sampling candidate segment $[Q_j, Q_{j+r+p}]$, the sampling point candidate $Q_{j+r+p-1}$ immediately anterior thereto is selected as an established sampling point to determine a sampling segment.

However, a modified procedure may be executed in such a manner that, when the deviation has exceeded the allowable error, the sampling point candidate $Q_{j+r+p}$ at the moment is stored temporarily, and the deviation $\epsilon$ is further appreciated with respect to a sampling candidate segment after several points. And when the allowable error condition is satisfied in the sampling candidate segment after several sampling point candidates, this segment is established correctively as a new sampling segment, and the aforementioned appreciation is executed repeatedly while advancing the sampling point therefrom. Due to such preliminary recognition in advance, it becomes possible to further lengthen the sampling segment, thereby increasing the data compression rate eventually.

It is a matter of course that if the deviation still exceeds the allowable error even after a predetermined number of points, a sampling segment is established with the aforesaid $Q_{j+r+p-1}$ selected as a sampling point. [Recomputation of inclinations at outline points 37]

The inclinations obtained in [Computation of inclinations at outline points 35] are of a quantized value based on the inclinations of individual line segments which connect the relevant outline point to a predetermined number of outline points anterior and posterior thereto, so that there may be a considerable difference from the actual outline inclination. In order to attain more faithful approximation to the outline, when necessary, the inclination is computed again in the following manner. That is, the inclination obtained from the first-degree derived function f'(x) of the third-degree polynomial f(x) in each sampling segment is decided to be an inclination at each outline point in the sampling segment. The embodiment of the present invention is so contrived that, after determination of each sampling segment, the entire inclinations at the individual outline points in each sampling segment are computed and stored.

[Redetermination of sampling points 38]

In case the inclination at each outline point is computed again in [Recomputation of inclinations at outline points 37] mentioned above, the same processing as in [Determination of sampling points 36] is executed by using such recomputed inclination at each outline point, and sampling segments are determined while establishing the sampling points again. The sampling segment thus redetermined is approximated according to a third-degree polynomial f(x) which is more faithful to the outline. Since the number of sampling segments is further reducible, the data compression rate can be raised as a result.

The procedures of [Recomputation of inclinations at outline points 37] and [Redetermination of sampling points 38] accomplish more faithful approximation of the outline and bring about enhancement in the data compression rate, but execution of such procedures requires a longer processing time.

Figure 14:
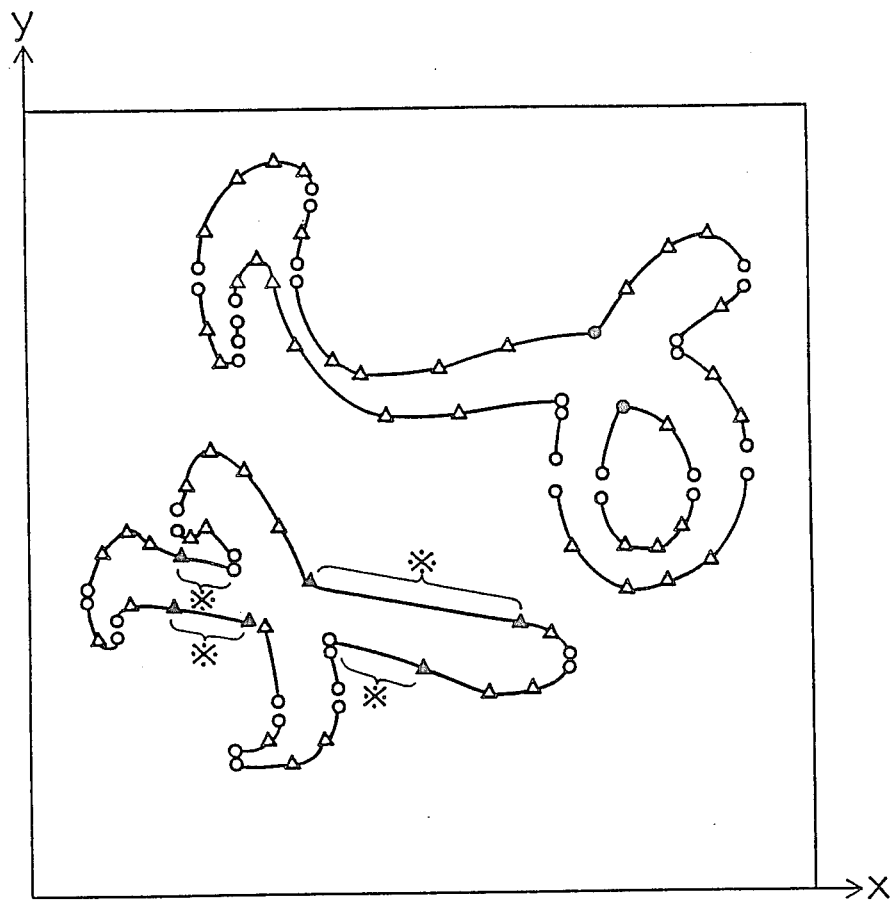
FIG. 14 is a diagram showing a state that sampling points are established on the character outlines.

In the case of a simple character, its outline can be faithfully approximated so that the above procedures are not necessary. FIG. 14 shows an example that the outline of FIG. 10 is processed by determination of sampling points (36) to redetermination of sampling points (38). In FIG. 14, marks "○" shows start and end point, respectively, ▲ a break point, ◉ a curved line splitting point, ✻ a straight line portion, no-mark a curved portion and Δ a sample point newly established.

[Encoding 39] and [Storage of compressed data 40]

Each straight portion stored at the straight line storing part 70 is regarded as a sampling segment and the coordinate of a start point is coded.

Subsequently the start point coordinates of each sampling segment in the curved portion obtained in [Determination of sampling points 36] or [Redetermination of sampling points 38] and the coefficients and degrees of the approximate curve expressed by the cubic polynomials f(x) are encoded respectively. Then these coded data are stored in the memory 50 and, thereby providing compressed data faithful to the outline.

Figure 15:
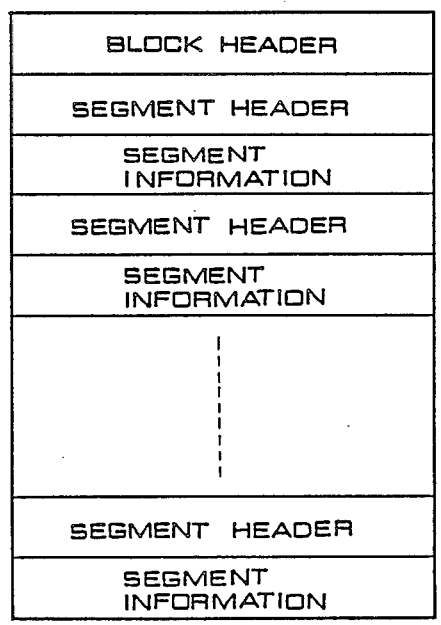
FIG. 15 is a diagram showing an example of a format which stores an arbitrary one block data.

FIG. 15 shows a preferred data format of one block applied in carrying out the present invention.

In this format, a block header stores the end point coordinates of one block and the number of sampling segments of straight and curved portions existing in one block; a segment header stores the start point coordinates of one sampling segment and the degree of cubic polynomial f(x); and segment information stores the coefficients of the cubic polynomial f(x) specified by the above degree.

According to the segment header and the segment information, there are arrayed the encoded data of a plurality of sampling segments by the number stored in the block header, thereby constituting block data that specify the outline shape of one block. With respect to any other block, data are constituted in a similar format to become compressed data which specify the outline shape of one character.

As described hereinabove, according to the present invention where straight portions and curved portions of an outline are discriminated from each other, any straight portion is represented by a straight line while any curved portion is represented by an approximate curve, so that it becomes possible to accomplish faithful reproduction of a character image. Furthermore, since the curved portion is sequentially split into sampling segments which are optimally approximatable with curves, the outline can be reproduced faithfully with a reduced number of sampling points. In addition, due to cubic polynomials for approximating the sampling segments with curves, the computation is executed for each of the sampling segments with the inclinations at its start and end points taken into consideration, whereby rapid processing is rendered possible without any complicated computation.

Besides the above, approximating the outline by cubic polynomials eliminates deterioration of the character image quality that may otherwise be induced at high scale factor conversion as in the conventional vector approximation.

As a result of experimentally applying the above-described character data processing apparatus of this invention to a Japanese Ming-style hiragana character "あ" composed of 800×800 dots, it has been verified that a data compression rate of 1.21% is attainable with one dot determined as an allowable error to a desired character image.

Although the foregoing description is concerned with an exemplary case of encoding and compressing the data of a character, it is obvious that the same processing can be performed with regard to any of various marks, symbols and line drawings in addition to characters.

Thus, according to the character data processing apparatus of this invention mentioned hereinabove, it becomes possible to quickly obtain storage data faithful to the smoothness of an outline at a sufficiently high compression rate.

What is claimed is:

1. An apparatus for processing character or pictorial image data comprising:
   (a) a vector computing means for obtaining length of a vector $V_i$ having a start point $P_i$ and an end point $P_{i+1}$ on any outline points among a plurality of outline points $Q_j$ constituting a character image outline and deviation between said vector and said outline points, and further obtaining said vector $V_i$ which is so established as to become maximum in length $l_i$ while said deviation is maintained to be less than a given allowable value,
   (b) a first comparing means for comparing said length $l_i$ of said vector $V_i$ with a preset length L,
   (c) a second comparing means for comparing an intersection angle $\theta_i$ between said vector $V_i$ and a vector $V_{i-1}$ adjacent to said vector $V_i$ with a preset angle $\theta$,
   (d) a discriminating means for identifying an outline segment $[P_i, P_{i+1}]$ approximated by said vector $V_i$ with a straight portion when the result of said comparison by said first comparing means is $l_i > L$, further identifying said outline segment $[P_i, P_{i+1}]$ with a curved portion when the result of said comparison is $l_i \leq L$, then repeating said comparison with respect to the next vector when the result of said comparison by said second comparing means is $\theta_i \geq \theta$, and further for identifying the preceding outline segments $[P_i, P_{i+k}]$ with a single continuous curved portion upon change of the result to $l_{i+k} > L$ or $\theta_{i+k} < \theta$ with respect to a vector $V_{i+k}$,
   (e) a third comparing means for establishing a sampling segment in the outline segments $[P_i, P_{i+k}]$ of said curved portion, selecting the outline start point $Q_j$ as a first sampling point, then establishing a sampling candidate segment $[Q_j, Q_{j+r}]$ while selecting an arbitrary outline point $Q_{j+r}$ on said outline as a sampling point candidate, subsequently computing a cubic polynomial f(x) to approximate said sampling candidate segment $[Q_j, Q_{j+r}]$ with a curved line on the basis of the coordinates $(x_j, y_j)$ and $(x_{j+r}, y_{j+r})$ of said sampling point $Q_j$ and said sampling point candidate $Q_{j+r}$ and also the inclinations $t_j$ and $t_{j+r}$ thereof, and comparing the deviation $\epsilon$ between the cubic polynomial f(x) and each of said outline points on said sampling candidate segment, with an allowable error $\Delta$,
   (f) a sampling segment establishing means for shifting a present sampling point candidate on the basis of said comparison results, then similarly comparing the deviation $\epsilon$ with the allowable error $\Delta$ with respect to the newly selected sampling candidate segment, establishing the sampling point candidate as the next sampling point in case that said comparison results meets $\epsilon \leq \Delta$ with respect to all outline points and that said sampling candidate segment becomes maximum, and thereafter establishing sampling segments sequentially over the entire outline segments $[P_i, P_{i+k}]$ which are identified with said signle continuous curved portion by making said newly established sampling point as a start point of the next sampling candidate segment, and
   (g) a memory means for storing the start point coodinates of the straight portion, and the start point coordinates of each sampling segment established on the curved portion, and the coefficient and the degree of said cubic polynomial which approximates each sampling segment.

2. An apparatus as claimed in claim 1 wherein the inclinations of said outline points are obtained on the basis of a mean value of inclination of each line segment connecting the outline points on the outline segments $[P_i, P_{i+k}]$ of said curved portion to the given outline points which are located before and behind said outline points, obtaining a plurality of cubic polynomials f(x) which approximate each section of said outline segments on the basis of said obtained inclinations of the outline points and coordinates of said outline points, obtained in advance the inclination t of all the outline points on said outline segments on the basis of a linear derived functions f'(x) of said cubic polynomials f(x), and obtaining cubic polynomials f(x) which approximate said sampling candidate segments $[Q_j, Q_{j+r}]$ by using said obtained inclinations of said outline points.

3. An apparatus as claimed in claim 1, wherein the computation of said deviation $\epsilon$ is executed as $$\epsilon = \frac{m}{\sqrt{m^2 + 1}} \epsilon_x \text{ when } |m| > 1$$

$$\epsilon = \frac{1}{\sqrt{m^2 + 1}} \epsilon_y \text{ when } |m| \leq 1$$

(in which m is the inclination of a straight line passing through the start and end points of a sampling candidate segment; and $\epsilon_x$ and $\epsilon_y$ are deviations between the outline point and the approximate curve in the x- and y-directions, respectively).

4. An apparatus as claimed in claim 1, wherein the outline point $Q_{j+r+1}$ adjacent to the present sampling point candidate segments $[Q_j, Q_{j+r}]$ is rendered a new sampling point candidate, the deviation $\epsilon$ is similarly compared with the allowable error $\Delta$ with reference to a renewed sampling candidate segment $[Q_j, Q_{j+r+1}]$, said sampling point candidate is shifted in turn until any of the comparison results becomes $\epsilon > \Delta$ and the comparison is repeated, and the sampling point candidate $Q_{j+r-p}$ is established as the next sampling point when all the outline points in the sampling candidate segments $[Q_j, Q_{j+r-p}]$ have been $\epsilon \leq \Delta$.

* * * * *